(12) United States Patent
Christians

(10) Patent No.: US 11,322,038 B2
(45) Date of Patent: May 3, 2022

(54) SIMULATOR AND METHOD FOR SIMULATING A USE OF A MISSILE

(71) Applicant: Rheinmetall Electronics GmbH, Bremen (DE)

(72) Inventor: Ernst Christians, Bremen (DE)

( * ) Notice: Subject to any disclaimer, the term of this patent is extended or adjusted under 35 U.S.C. 154(b) by 119 days.

(21) Appl. No.: 16/616,344

(22) PCT Filed: Mar. 13, 2018

(86) PCT No.: PCT/EP2018/056257
§ 371 (c)(1),
(2) Date: Nov. 22, 2019

(87) PCT Pub. No.: WO2018/215104
PCT Pub. Date: Nov. 29, 2018

(65) Prior Publication Data
US 2020/0175888 A1  Jun. 4, 2020

(30) Foreign Application Priority Data
May 24, 2017  (DE) ..................... 10 2017 111 476.9

(51) Int. Cl.
*G09B 9/00* (2006.01)
*G06T 7/73* (2017.01)
(Continued)

(52) U.S. Cl.
CPC .............. *G09B 9/003* (2013.01); *F41A 33/00* (2013.01); *F41G 3/2644* (2013.01); *F41G 7/006* (2013.01);
(Continued)

(58) Field of Classification Search
CPC .. G09B 9/00; G09B 9/003; G06T 7/75; G06T 17/05; F41A 33/00; F41A 33/02;
(Continued)

(56) References Cited

U.S. PATENT DOCUMENTS 6,283,756 B1 * 9/2001 Danckwerth ........... F41A 33/00
434/11
8,303,308 B2 * 11/2012 Lindero ................ F41G 3/2655
434/11
(Continued)

FOREIGN PATENT DOCUMENTS

CA      2368821 A1   10/2000
DE    19606685 A1    7/1997
(Continued)

OTHER PUBLICATIONS

Korean Intellectual Property Office, Office Action Issued in Application No. 10-2019-7036789, dated Nov. 24, 2020, Korea, 11 Pages.
(Continued)

*Primary Examiner* — Timothy A Musselman
(74) *Attorney, Agent, or Firm* — Alleman Hall Creasman & Tuttle LLP

(57) ABSTRACT

A simulator for simulating a use of a missile of an attacking system is proposed. The simulator comprises: a storage device for storing of a terrain model of a battle terrain and target object models of target objects; a sensing unit for sensing and tracking a defined target object of the target objects in the battle terrain; a transmitting unit for transmitting a coded laser signal to the defined target object; a receiving unit for receiving a response signal transmitted by the defined target object; a providing unit for providing a target object model for the defined target object in dependence on at least type information of the received response signal; and a visual means associated with the missile for outputting a current visual representation of the battle terrain by means of the terrain model, the provided target object model and the location information.

14 Claims, 6 Drawing Sheets

Figure 1:
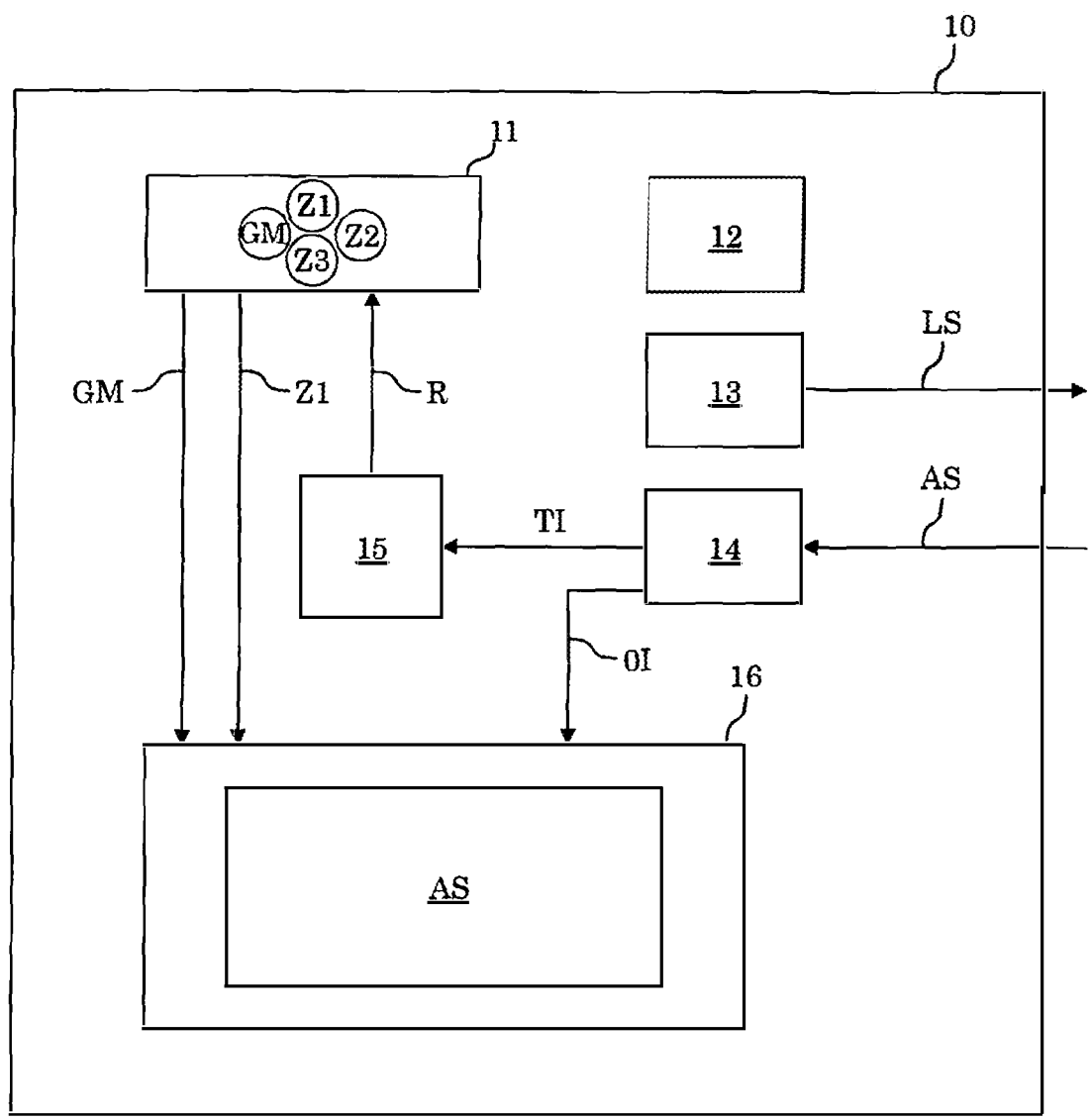

(51) Int. Cl.
*F41A 33/00* (2006.01)
*F41G 3/26* (2006.01)
*F41G 7/00* (2006.01)
*G06F 3/01* (2006.01)
*G06T 17/05* (2011.01)

(52) U.S. Cl.
CPC ............... *G06F 3/011* (2013.01); *G06T 7/75* (2017.01); *G06T 17/05* (2013.01)

(58) Field of Classification Search
CPC .. F41A 33/04; F41A 33/06; F41G 3/26; F41G 3/2644; F41G 7/00; F41G 7/006; G06F 3/011; F41J 5/00; F41J 5/02
See application file for complete search history.

(56) References Cited

U.S. PATENT DOCUMENTS

| | | | |
|---|---|---|---|
| 2008/0160486 A1 | 7/2008 | Tengblad | |
| 2011/0311949 A1* | 12/2011 | Preston | F41G 3/2666 434/16 |
| 2016/0169627 A1 | 6/2016 | Northrup et al. | |

FOREIGN PATENT DOCUMENTS

| | | |
|---|---|---|
| DE | 102005055099 A1 | 5/2007 |
| DE | 102015120929 A1 | 6/2017 |
| EP | 1167913 A1 | 1/2002 |
| EP | 1166029 B1 | 9/2002 |
| WO | 02084201 A1 | 10/2002 |

OTHER PUBLICATIONS

Intellectual Property Office of Singapore, Written Opinion in Application No. 11201910325Y, dated Nov. 12, 2020, Singapore, 6 Pages.
ISA European Patent Office, International Search Report Issued in Application No. PCT/EP2018/056257, dated Jun. 19, 2018, WIPO, 2 pages.
International Bureau of WIPO, International Preliminary Report on Patentability Issued in Application No. PCT/EP2018/056257, dated Dec. 5, 2019, WIPO, 9 pages.
Canadian Intellectual Property Office, Examination Search Report Issued in Application No. 3,060,607, dated Aug. 31, 2021, 3 pages.
IP Australia, Office Action Issued in Application No. 2018274474, dated May 19, 2020, Australia, 4 Pages.
Canadian Intellectual Property Office, Office Action Issued in Application No. 3,060,607, dated Dec. 29, 2020, 3 pages.
European Patent Office, Office Action Issued in Application No. 18711306.3, dated Oct. 6, 2021, Germany, 7 pages.
German Patent and Trademark Office, Office Action Issued in Application No. 102017111476.9, dated Nov. 30, 2021, 10 pages.
Ministry of Law and Human Rights Republic of Indonesia Directorate General of Intellectual Property, Office Action Issued in Application No. P00201911521, dated Aug. 21, 2021, 12 pages.

* cited by examiner

SIMULATOR AND METHOD FOR SIMULATING A USE OF A MISSILE

The present invention relates to a simulator for simulating a use of a missile of an attacking system in a battle terrain. Furthermore, the present invention relates to a method as well as a computer program product for simulating a use of a missile of an attacking system in a battle terrain.

The technical field of the present invention relates to the simulation of remotely-controlled missiles in a real training environment of a battle terrain.

Methods which are known in the training of operators of remotely-controlled missiles are based on a virtual simulation of target objects in a computer with an image generating system as well as on a laser-based training in direct aligning of the missile. The virtual simulation almost completely takes place in a simulated environment predefined by a computer, in particular without direct reference to target objects available in real-life such as tanks or trucks. The laser-based simulation uses existing, laser-sensitive instrumented target objects in the real terrain environment of the operator, which can, at the target sensing and target tracking, be aimed by an optical and/or electrical visor which is available in the guidance device of the operator, and which can be tracked during the flight phase of the missile.

Modern guidance systems are characterized by the fact that imaging components of the electronic target sensing components and target tracking components installed in the missile can be faded, at least during the flight phase of the guided missile, into the visual means of the operator. Under certain conditions, the operator may even be able to intervene in the target tracking process in a controlling manner or to commence in a combat without initial target contact and to carry out the target assignment only in the guided missile's flight phase.

However, these latter possibilities cannot be simulated in a real training environment using the known methods mentioned above.

In the laser-based simulation, for safety reasons, no real firing of the missile is permitted at which the imaging components could approach the real target object at high speed and thereby provide suitable image sequences during flight. In addition, this would not be an economically viable solution, since such a missile would very likely be destroyed after a single use. Due to the required high speeds of more than 500 km/h, the solution of using a multi-usable miniature drone is also excluded.

In contrast, in the virtual simulation, the reference to the real environment of the battle terrain is missing. In principle, this reference can be established by continuously transmitting information about the position, speed and type of the target objects as well as the operator's position and target direction data. On the one hand, however, it must be taken into account that up to several hundred different potential targets or target objects can usually be located in a training environment such as a combat training center. A quasi-continuous transmission of all relevant target data and all potentially combated systems requires extremely high bandwidths and would thus at least significantly increase the costs of the combat training center of the training systems, in particular the simulators.

On the other hand, the technical possibilities to determine the azimuth of the sighting direction of the operator with milliradian accuracy are limited, especially at dynamic procedures. A laser-based simulation can achieve accuracies up to the sub-milliradian range. However, this accuracy is limited by a separate coordinate system independent of the environment. This results in the following problems at the coupling of laser-based simulation and virtual simulation.

On the one hand, the coupling of the precise laser-based simulation part is missing, e.g. to a world coordinate system, which could be used by virtual simulation computers as a joint reference system.

On the other hand, conventional directing components are inaccurate and partly vulnerable to disturbances. The supposed direction of the virtual part can depend in the degree range from the actual orientation of the visor, whereby 1 degree of deviation at a maximum range of 4,000 m, for example, already means 70 m to the left or right of the target object. In comparison, the deviation for a laser simulator at 4,000 m is about 1 m.

In addition, leaps in the line of sight are to be expected during a transition from laser-based simulation to virtual simulation, which actually make a meaningful use in the training conventionally very difficult.

As can be seen from the above, the simulation of an aligning process, in which the missile is first fired in a rough direction without reference to a target and then, during the flight phase only, senses and tracks targets, can be depicted with existing technical means in a reasonably usable manner, since a previous reference to the real environment is required here and the technical deviations are not formatively come to their own.

Against this background, an object of the present invention is to improve the simulation of a use of a missile in a battle terrain.

Accordingly, a simulator for simulating a use of a missile of an attacking system in a battle terrain is proposed. The simulator comprises a storage device for storing a terrain model of the battle terrain and a number of target object models of target objects, a sensing unit associated with the attacking system for sensing and tracking a defined target object of the target objects in the battle terrain, a transmitting unit associated with the attacking system for transmitting a coded laser signal to the defined target object, wherein the coded laser signal comprises at least an identification of the attacking system, a receiving unit associated with the attacking system for receiving a response signal transmitted by the defined target object as a response to the laser signal, the response signal comprising at least a location information and a type information of the defined target object, a providing unit for providing a target object model stored in the storage device in dependence on at least the type information of the received response signal, for the defined target object, and a visual means associated with the missile of the attacking system for outputting a current visual representation of the battle terrain by means of the terrain model, the provided target object model and the location information of the response signal.

Advantageously, the accuracy of the coded laser signal is used herein to provide the visual means and thus the current visual representation, in particular the current virtual visual representation, with as precise data as possible of the position of the targeted here determined target object. The communication effort and thus the necessary data quantity to be transmitted is advantageously very limited by the use of only the directed coded laser signal and its response signal of the defined target object. Preferably, the visual means is configured, based on the transmitted data of the response signal, to synchronize a virtual simulation of the target object with the laser-based identified target.

The simulator herein can also be described as simulation device, simulation apparatus or missile simulator. The battle terrain can also be described as a combat training terrain or training area. In particular, the storage device comprises a RAM storage, a ROM storage and/or an EEPROM storage. The terrain model is in particular a virtual three-dimensional model of the present battle terrain. The respective target object model is in particular a three-dimensional virtual model of the respective target object. The target object is, for example, a tank or a truck.

In particular, the transmitting unit comprises a laser-based part of the simulator or missile simulator. Preferably, the target objects are targets equipped for the laser-based simulation.

The response signal is particularly transmitted via radio. Preferably, in addition to the location information and the type information of the defined target object, the response signal comprises further information useful for spatial and temporal synchronization. In particular, the location information comprises a position in a predetermined coordinate system, for example the world coordinate system. The location information particularly comprises the position of the defined target object. In particular, the type information indicates the type of the defined target object, for example the type of a certain tank.

The following example of a combat training can illustrate the mode of action of the simulator. All systems participating in the combat training, herein the attacking system as well as the target objects, have their own position in a common coordinate system by means of a positioning system, such as GPS. The transmitting unit of the simulator, for example, embodied as the laser-based part of the missile simulator, transmits laser codes during target sensing and target tracking, especially before the simulated firing of the missile, which are sensed and evaluated by the likewise instrumented targeted target object or target system. In particular, this data includes information about the identity, for example an ID number, and the type of weapon of the target sensing attacking system. This data can be transmitted directly or in a combat training center also with priority by data radio via a combat training center, which has information about type and preferably current position and movement vectors of all training participants.

Based on the position of the attacking system, which is determined by its ID number, and the position of the targeted target object, the combat training center has all the data it needs in order to identify potential further targets along the reference line between the attacking system and the defined target object and to transmit their data, together with information of the targeted target object, via radio data directly to the attacking system as the response signal.

As a result, it is clear that the amount of data to be transmitted is significantly reduced. In addition, the reference between the relative laser-based coordinate system and a world coordinate system can be established automatically. By firing the missile, the visual means can switch to a virtual visual representation, wherein the virtual simulation representation can be synchronized with the laser-based identified target on the basis of the data transmitted by the response signal.

According to an embodiment, the visual means is configured to output a real visual representation of the battle terrain as well as a virtual visual representation of the battle terrain.

Thus, the visual means is advantageously configured for the coupling of live combat simulation and virtual combat simulation.

According to a further embodiment, the visual means is configured to switch from the real visual representation to the virtual visual representation at the moment of firing the missile.

Since the missile is not really fired during a combat simulation, at the time point the missile is fired, it is switched from the real visual representation to the virtual visual representation by the visual means.

According to a further embodiment, the coded laser signal comprises the identification of the attacking system and an ammunition type of the missile of the attacking system.

According to further embodiment, the response signal comprises the location information of the defined target object, the type information of the defined target object and a movement vector of the defined target object.

According to further embodiment, the simulator comprises a setting unit for setting an orientation of the attacking system in dependence on the location information of the response signal.

This allows the attacking system, in particular the missile, to be aligned with the target. As a result, the defined target object is exactly in the line of sight of the missile.

According to a further embodiment, the setting unit is configured to set the orientation of the attacking system in dependence on the location information of the response signal and a reconciliation of geometric three-dimensional data from the terrain model with information at least of an imaging device associated with the attacking system.

According to a further embodiment, the simulator comprises at least an imaging device for capturing at least an image of the battle terrain.

According to a further embodiment, the at least one imaging device comprises a daylight camera, a thermal imaging camera and/or a laser scanner.

According to a further embodiment, the simulator comprises an image processing unit for detecting of significant points of the defined target object in the image which is at least captured by the one imaging device.

According to a further embodiment, the receiving unit is configured to receive the response signal from the defined target object directly.

In this embodiment, the response signal is transmitted, for example by radio, from the defined target object to the receiving unit directly and thus to the attacking system.

According to a further embodiment, the receiving unit is configured to receive the response signal transmitted from the defined target object via a combat training center.

In particular, the combat training center has information on the type, current position and movement vectors of all systems participating in the combat training. The combat training center is preferably configured to identify, based on the position of the attacking system and that of the targeted defined target object, also potential further target objects along the reference line between the attacking system and the defined target object, and to transmit their data together with information of the targeted target object to the attacking system by radio.

Preferably, additional information about potential target objects along the identified line of sight is transmitted to the attacking system and displayed there in the virtual simulation by the visual means.

According to a further embodiment, results of a virtual combat of the defined target object are transmitted back to the real target object via radio data transmission.

The respective unit, e.g. the providing unit, may be implemented in hardware and/or in software. If said unit is implemented in hardware, it may be embodied as a device or as a part of a device, e.g. as a computer or as a processor. If said unit is implemented in software it may be embodied as a computer program product, as a function, as a routine, as a part of a program code or as an executable object.

Further, a method for simulating a use of a missile of an attacking system in a battle terrain is proposed. The method comprises the following steps a) to f):
    a) storing of a terrain model of the battle terrain and a number of target object models of target objects in a storage device,
    b) sensing and tracking of a defined target object of the target objects in the battle terrain,
    c) transmitting of a coded laser signal from a transmitting unit associated with the attacking system to the defined target object, wherein the coded laser signal comprises at least an identification of the attacking system,
    d) receiving a response signal transmitted by the defined target object as a response to the laser signal by a receiving unit associated with the attacking system, the response signal comprising at least location information and type information of the defined target object,
    e) providing, in dependence on at least the type information of the received response signal, a target object model for the defined target object, the target object model being stored in the storage device, and
    f) outputting a current visual representation of the battle terrain by means of the terrain model, the provided target object model and the location information of the response signal by a visual means associated with the missile of the attacking system.

The embodiments and features described with reference to the proposed simulator apply mutatis mutandis to the proposed method.

Furthermore, a computer program product is proposed which comprises program code for executing the above-described method when run on at least one computer.

A computer program product, such as a computer program means, may be provided or delivered as a memory card, USB stick, CD-ROM, DVD or also as a file which may be downloaded from a server in a network. For example, in a wireless communication network, this can be done by transferring a corresponding file using the computer program product or the computer program means.

Further possible implementations of the present invention also comprise combinations—that are not explicitly mentioned herein—of features or embodiments described above or below with regard to the embodiments. Thereby, the skilled person may also add isolated aspects as improvements or additions to the respective basic form of the present invention.

Further advantageous embodiments and aspects of the present invention are subject-matter of the dependent claims as well as the below described embodiments of the present invention. Further, with reference to the attached drawings, the present invention is discussed in more detail on the basis of preferred embodiments.

Figure 2:
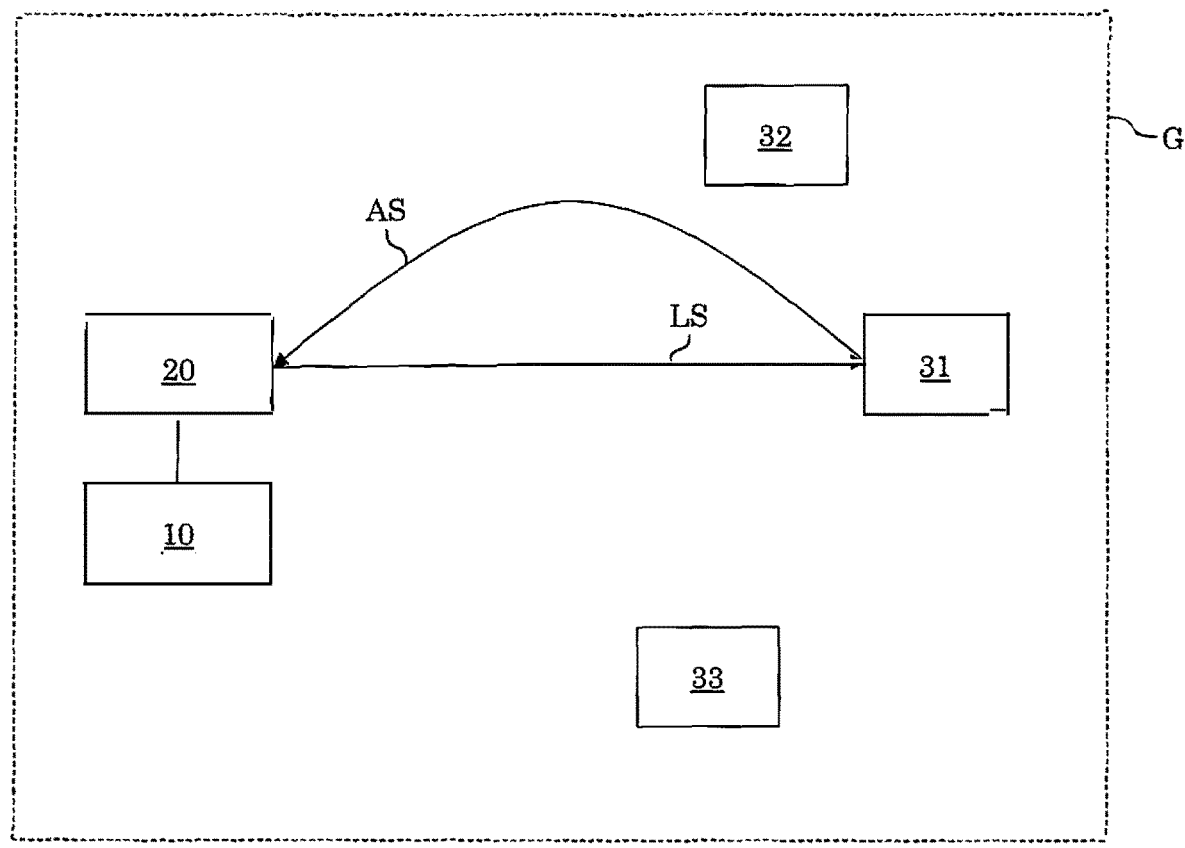
Figure 3:
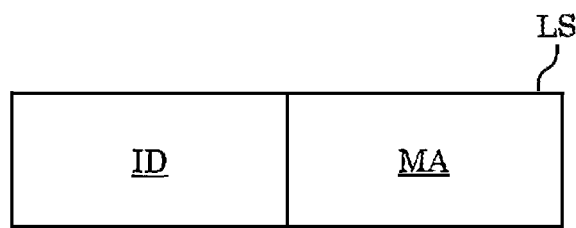
Figure 4:
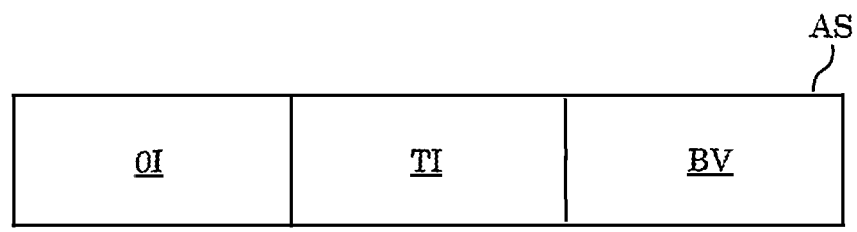
Figure 5:
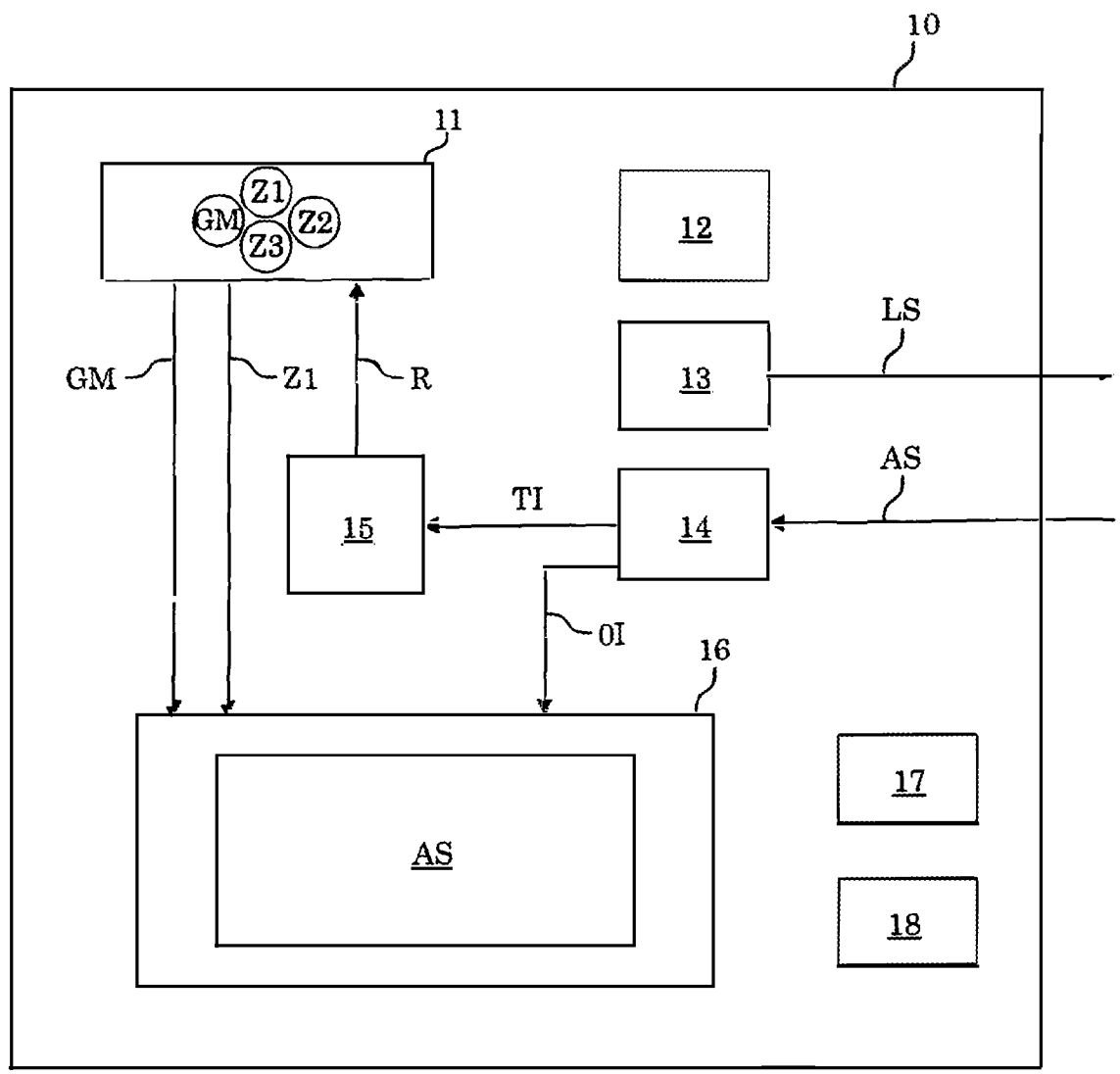
Figure 6:
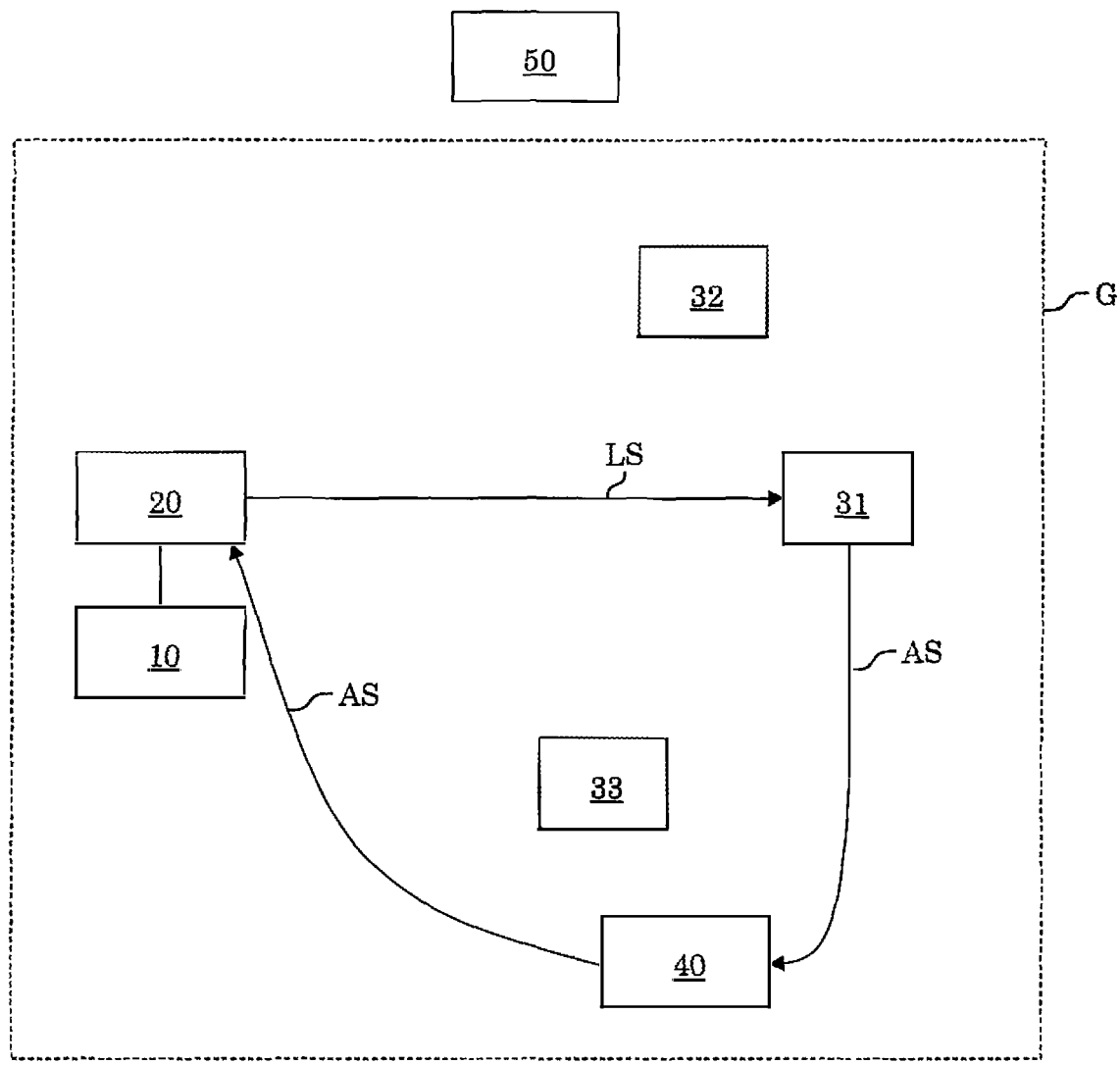
Figure 7:
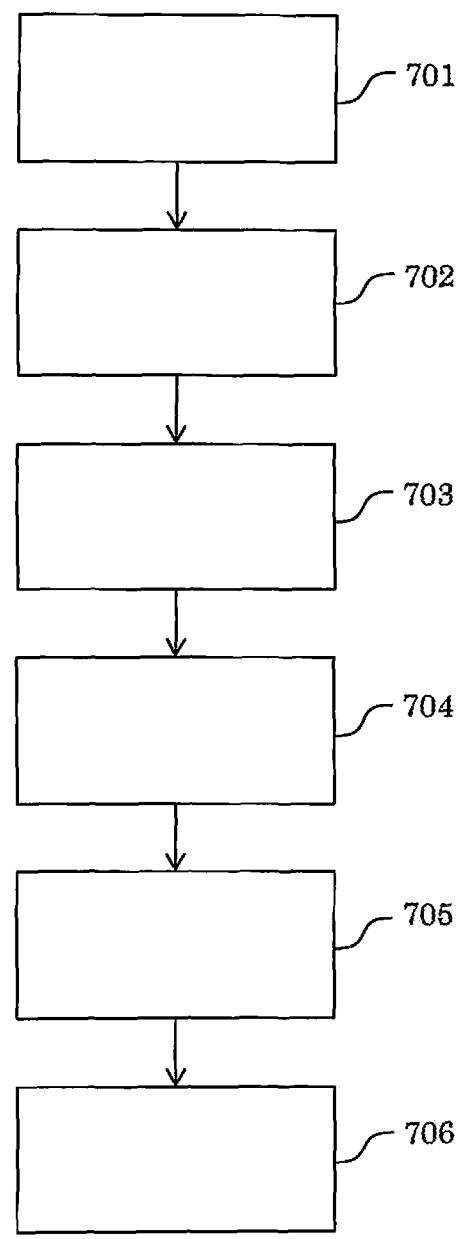

FIG. 1 shows a schematic block diagram of a first embodiment of a simulator for simulating a use of a missile of an attacking system in a battle terrain;

FIG. 2 schematically shows a first embodiment of a battle terrain using a simulator according to FIG. 1;

FIG. 3 schematically shows an embodiment of a coded laser signal transmitted by a transmitting unit of the simulator according to FIG. 1;

FIG. 4 schematically shows an embodiment of a response signal received by a receiving unit of the simulator according to FIG. 1 in response to the coded laser signal;

FIG. 5 shows a schematic block diagram of a second embodiment of a simulator for simulating a use of a missile of an attacking system in a battle terrain;

FIG. 6 schematically shows a second embodiment of a battle terrain using a simulator according to FIG. 1 or FIG. 5; and FIG. 7 shows a schematic flow diagram of an embodiment of a method for simulating a use of a missile of an attacking system in a battle terrain.

In the figures, the same or functionally identical elements have been given the same reference numerals, unless otherwise indicated.

In FIG. 1, a schematic block diagram of a first embodiment of a simulator 10 (FIG. 2) for simulating a use of a missile of an attacking system 20 in a battle terrain G is shown.

The first embodiment of the simulator 10 of FIG. 1 is explained in more detail with reference to FIGS. 2-5. Thereby, FIG. 2 shows a first embodiment of the battle terrain G with the simulator 10 according to FIG. 1.

The simulator 10 is coupled or connected with an attacking system 20 according to FIG. 2. In particular, the attacking system 20 comprises a missile, preferably a guided missile, for example for tank defence or air defence. For example, there are three target objects 31-33 in the battle terrain G. Without loss of generality, only three target objects 31-33 are shown in the battle terrain G. The respective target object 31-33 can be, for example, an enemy tank, an enemy truck, a helicopter or the like.

The simulator 10 of FIG. 1 comprises a storage device 11, a sensing unit 12, a transmitting unit 13, a receiving unit 14, a providing unit 15 as well as a visual means 16.

The storage device 11 is configured to store a terrain model GM of the battle terrain G, for example according to FIG. 2, and a number of target object models Z1-Z3 of the target objects 31-33. In particular, the respective target object model Z1-Z3 is a three-dimensional virtual target object model which can be deposited as an electronic file in the storage device 11 and can be displayed as a virtual representation in the visual means 16. For example, the storage device 11 comprises a RAM storage, a ROM storage and/or an EEPROM storage.

In particular, the sensing unit 12 is assigned to the attacking system 20 and is configured to sense and to track a defined target object, for example the target object 31 of the target objects 31-33, which are located in the battle terrain G. For this purpose, the sensing unit 12 particularly comprises a tracking unit (not shown).

The transmitting unit 13 is particularly assigned to the attacking system 20 and is configured to transmit a coded laser signal LS (see FIG. 1 and FIG. 2) to the defined target object 31. For this purpose, the transmitting unit 13 particularly comprises a laser which can be aligned with the defined target object 31 and by means of which the coded laser signal LS is directly transmitted to the defined target object 31. The respective target object 31-33 is instrumented in such a way to be able to sense and evaluate the coded laser beam.

In particular, the simulator 10 is configured for simulating a combat training in the battle terrain G. All systems participating in the combat training, with reference to FIG. 2 the attacking system 20 as well as the target objects 31-33, particularly have their own location information or position in a common coordinate system by means of a positioning system, for example GPS.

The coded laser signal LS comprises at least an identification ID of the attacking system 20. With reference to FIG.

3, the coded laser signal LS also comprises, in addition to the identification ID of the attacking system 20, information on the ammunition type MA of the missile of the attacking system 20.

The receiving unit 14 of the simulator 10 is particularly assigned to the attacking system 20 and configured to receive a response signal AS transmitted by the defined target object 31 in response to the laser signal LS. In the example of FIG. 2, the receiving unit 14 is configured to receive the response signal AS from the defined target object 31 directly. Preferably, for transmitting the response signal AS, a radio transmission is used.

The response signal AS transmitted by the defined target object 31 comprises at least a location information OI (or position) of the defined target object 31 as well as a type information TI of the defined target object 31. With reference to FIG. 4, the response signal AS comprises, in addition to the location information OI of the defined target object 31 and the type information TI of the defined target object 31, a movement vector BV of the defined target object 31. The location information OI comprises, for example, GPS coordinates of the defined target object 31, which is formed as an enemy tank for example. The type information TI of the defined target object 31 designates the type of the target object 31 and thus a defined tank type as a present example. The movement vector BV of the defined target object 31 indicates movements and preferably speeds of the defined target object 31 in the battle terrain G.

The providing unit 15 of the simulator 10 is configured to provide a target object model Z1 stored in the storage device 11 for the defined target object 31 in dependence on at least the type information TI of the received response signal AS. In other words, the providing unit 15 uses the received type information TI of the response signal AS to load the target object model Z1, associated with the defined target object 31 and stored in the storage device 11, by means of a request R from the storage device 11 and to provide it for outputting to the visual means 16.

The visual means 16 particularly comprises a number of displays and/or monitors and is configured to output a current visual representation of the battle terrain G using the terrain model GM, the provided target object model Z1 and the location information OI from the response signal AS. In particular, the current visual representation output by the visual means 16 is a virtual three-dimensional representation of the battle terrain G with a three-dimensional virtual model of the defined target object 31 and the relevant location information or positions of at least the attacking system 20 and the defined target object 31, and preferably the further target objects 32 and 33.

Preferably, the visual means 16 is configured to display both a real visual representation of the battle terrain G and a virtual visual representation of the battle terrain G. In particular, the visual means 16 switches from the real visual representation to the virtual visual representation at the moment of a virtual firing of the missile. One reason for this switching between the real visual representation and the virtual visual representation at the moment of firing is that the missile is not really fired in the real combat training, but this firing is only simulated. All further data of the missile, especially after firing the missile, is simulated. In particular, a missile comprises a number of cameras, such as a daylight camera, a thermal imaging camera and/or a laser scanner. The data of these cameras is displayed by the visual means 16 before firing, whereas after firing, this data is simulated on the basis of the terrain model GM, the target object models Z1-Z3, the coded laser signal LS and the response signal AS.

FIG. 5 shows a schematic block diagram of a second embodiment of a simulator 10 for simulating a use of a missile of an attacking system 20 in a battle terrain G.

The second embodiment of FIG. 5 comprises all features of the first embodiment of the simulator 10 according to FIG. 1. In addition, the simulator 10 of FIG. 5 comprises a setting unit 17 for setting an orientation of the attacking system 20 in dependence on the location information OI of the response signal AS. In particular, the setting unit 17 can align the line of sight of the missile of the attacking system 20 with the defined target object 31 by means of the location information OI.

For the alignment of the attacking system 20 to the defined target object 31, the setting unit 17 preferably uses, in addition to the location information OI of the response signal AS, a reconciliation of geometric three-dimensional data from the terrain model GM with information from at least one imaging device assigned to the attacking system 20. As already mentioned above, the missile may comprise various imaging devices such as a daylight camera, a thermal imaging camera and/or laser scanner.

Furthermore, the simulator 10 of FIG. 5 comprises an image processing unit 18. Preferably, the image processing unit 18 is configured to detect significant points of the defined target object 31 in the image captured by the at least one imaging device or in a sequence of images.

In FIG. 6, a second embodiment of a battle terrain G with a simulator 10 is schematically shown. For example, the simulator 10 is embodied according to FIG. 1 or FIG. 5. In the example of FIG. 6, a combat training center 40 is located in the battle terrain G. Alternatively, the combat training center 40 can also be located outside of the battle terrain G. In the example of FIG. 6, the response signal AS is not directly transmitted from the responding defined target object 31, which has received the coded laser signal LS from the attacking system 20 and has evaluated it, back to the attacking system 20. In the example in FIG. 6, the response signal AS is transmitted via a first radio link to the combat training center 40. The combat training center 40 then transmits the response signal AS to the attacking system 20 via a second radio link.

FIG. 7 shows a schematic flow diagram of an embodiment of a method for simulating a use of a missile of an attacking system 20 in a battle terrain G. Examples of the battle terrain G are shown in FIGS. 2 and 6.

The method of FIG. 7 comprises the following steps 701-706:

In step 701, a terrain model GM of battle terrain G and a number of target object models Z1-Z3 of target objects 31-33 are stored in a storage device 11 (see FIG. 1).

In step 702, a defined target object, for example target object 31 (see FIG. 2), of the target objects 31-33 is sensed and tracked in the battle terrain G.

In step 703, a coded laser signal LS is transmitted from a transmitting unit 13 (see FIG. 1) assigned to the attacking system 20 to the defined target object 31. The coded laser signal LS comprises at least an identification ID of the attacking system 20.

In step 704, a response signal AS transmitted by the defined target object 31 in response to the laser signal LS is received by a receiving unit 14 assigned to the attacking system 20. The response signal AS comprises at least a location information OI or position of the defined target object 31 and a type information TI of the defined target object 31.

In step 705, a target object model Z1 stored in the storage device 11 is provided for the defined target object 31 in dependence on at least the type information TI of the received response signal AS.

In step 706, a current visual representation of the battle terrain GM is output to the operator, such as a training soldier, by means of a visual means 16 associated with the attacking system 20 (see FIG. 1), using the terrain model GM, the provided target object model Z1 and the location information OI of the response signal AS. In particular, the output comprises a visual output and additionally an audio output.

Although the present invention has been described in dependence on preferred embodiments, it is obvious for the person skilled in the art that modifications are possible in all embodiments.

LIST OF REFERENCE NUMBERS 10 simulator
20 attacking system
31-33 target object
11 storage device
12 sensing unit
13 transmitting unit
14 receiving unit
15 providing unit
16 visual means
17 setting unit
18 image processing unit
31-33 target object
40 combat training center
50 tracking system
701-706 method steps
AS response signal
BV movement vector
G battle terrain
GM terrain Model
ID identification
LS laser signal
MA ammunition type
OI location information
R request
TI type information
Z1-Z3 target object model

The invention claimed is:

1. Simulator for simulating a use of a missile of an attacking system in a battle terrain, comprising:
a storage device for storing at least a terrain model of at least a battle terrain and a number of target object models of target objects,
a sensing unit associated with the attacking system for sensing and tracking a defined target object of the target objects in the battle terrain,
a transmitting unit associated with the attacking system for transmitting a coded laser signal to the defined target object, wherein the coded laser signal comprises at least an identification of the attacking system,
a receiving unit associated with the attacking system for receiving a response signal transmitted by the defined target object as a response to the laser signal, the response signal comprising at least a location information and a type information of the defined target object,
a providing unit for providing a target object model stored in the storage device in dependence on at least the type information of the received response signal, for the defined target object, and
a visual means associated with the attacking system for outputting a current visual representation of the battle terrain by means of the terrain model, the provided target object model and the location information of the response signal.

2. Simulator according to claim 1,
characterized in
that the visual means is configured to output a real visual representation of the battle terrain as well as a virtual visual representation of the battle terrain.

3. Simulator according to claim 2,
characterized in
that the visual means is configured to switch from the real visual representation to the virtual visual representation at the moment of firing the missile.

4. Simulator according to one of claim 1,
characterized in
that the coded laser signal comprises the identification of the attacking system and an ammunition type of the missile of the attacking system.

5. Simulator according to one of claim 1,
characterized in
that the response signal comprises the location information of the defined target object, the type information of the defined target object and a movement vector of the defined target object.

6. Simulator according to one of claim 1,
characterized by
a setting unit for setting an orientation of the attacking system in dependence on the location information of the response signal.

7. Simulator according to claim 6,
characterized in
that the setting unit is configured to set the orientation of the attacking system in dependence on the location information of the response signal and a reconciliation of geometric three-dimensional data from the terrain model with information of at least an imaging device associated with the attacking system.

8. Simulator according to one of claim 1,
characterized by
at least an imaging device for capturing at least an image of the battle terrain.

9. Simulator according to claim 8,
characterized in
that the at least one imaging device comprises a daylight camera, a thermal imaging camera and/or a laser scanner.

10. Simulator according to claim 8,
characterized by
an image processing unit for detecting of significant points of the defined target object in the image captured by the at least one imaging device.

11. Simulator according to one of claim 1,
characterized in
that the receiving unit is configured to directly receive the response signal from the defined target object.

12. Simulator according to one of claim 1,
characterized in
that the receiving unit is configured to receive the response signal transmitted from the defined target object via a combat training center.

13. Method for simulating a use of a missile of an attacking system in a battle terrain, comprising:

a) storing of at least a terrain model of at least a battle terrain and a number of target object models of target objects in a storage device,
b) sensing and tracking of a defined target object of the target objects in the battle terrain,
c) transmitting a coded laser signal from a transmitting unit associated with the attacking system to the defined target object, wherein the coded laser signal comprises at least an identification of the attacking system,
d) receiving a response signal transmitted by the defined target object as a response to the laser signal by a receiving unit associated with the attacking system, the response signal comprising at least location information and type information of the defined target object,
e) providing, in dependence on at least the type information of the received response signal, a target object model stored in the storage device for the defined target object, and
f) outputting a current visual representation of the battle terrain by means of the terrain model, the provided target object model and the location information of the response signal by a visual means associated with the attacking system.

14. A computer program product comprising a program code for executing a method for simulating a use of a missile of an attacking system in a battle terrain according to claim 13 when run on at least one computer.

\* \* \* \* \*